United States Patent
Kobayashi

(10) Patent No.: US 6,544,142 B2
(45) Date of Patent: Apr. 8, 2003

(54) TRANSMISSION SYSTEM FOR VEHICLE

(75) Inventor: Toshio Kobayashi, Tokyo-To (JP)

(73) Assignee: Fuji Jukogyo Kabushiki Kaisha, Tokyo-To (JP)

( * ) Notice: Subject to any disclaimer, the term of this patent is extended or adjusted under 35 U.S.C. 154(b) by 2 days.

(21) Appl. No.: 09/955,207

(22) Filed: Sep. 19, 2001

(65) Prior Publication Data

US 2002/0033071 A1 Mar. 21, 2002

(30) Foreign Application Priority Data

Sep. 20, 2000 (JP) ........................................ 2000-285016
Sep. 20, 2000 (JP) ........................................ 2000-285017
Aug. 24, 2001 (JP) ........................................ 2001-255041
Aug. 24, 2001 (JP) ........................................ 2001-255042

(51) Int. Cl.$^7$ .............................................. F16H 61/48
(52) U.S. Cl. ............................ 477/54; 477/55; 477/109
(58) Field of Search ............................. 477/54, 55, 56, 477/57, 58, 109

(56) References Cited

U.S. PATENT DOCUMENTS 5,305,213 A * 4/1994 Boardman et al. .......... 477/109

FOREIGN PATENT DOCUMENTS

| JP | 4-203669 | 7/1992 |
| JP | 2000-55184 | 2/2000 |

* cited by examiner

Primary Examiner—Dirk Wright
(74) Attorney, Agent, or Firm—Smith, Gambrell & Russell

(57) ABSTRACT

An automatic transmission system for a vehicle having a plurality of drive gears mounted on an input shaft, a plurality of driven gears mounted on an output shaft and meshing with the drive gears, a torque converter disposed between a crankshaft of an engine and the input shaft, synchromesh mechanisms for synchronously engaging the drive gears with the driven gears and a shift controller for automatically actuating the synchromesh mechanisms so as to obtain a required gear ratio, includes a lock-up clutch incorporated in the torque converter for connecting a turbine shaft of the torque converter with the crankshaft, an electronically controlled throttle valve for automatically operating to reduce a rotation speed of the crank shaft when the gear is shifted, a bypass clutch for transmitting torque from the input shaft to the output shaft when the gear is shifted while the electronically controlled throttle valve operates to reduce a rotation speed of the crankshaft, an input clutch provided between an output element of the torque converter and the input shaft for selectively controlling a torque transmission from the crankshaft to the input shaft when the gear is shifted, and a brake mechanism provided on an impeller shell of the torque converter for additionally reducing a rotational speed of the crankshaft while the electronically controlled throttle valve operates to reduce a rotational speed of the crankshaft.

9 Claims, 13 Drawing Sheets

3:INPUT SHAFT
4:OUTPUT SHAFT
5:TRANSMISSION CASE
6:TORQUE CONVERTER
7:CRANK SHAFT

18:BYPASS CLUTCH
41:PUMP IMPELLER
51:LOCK-UP CLUTCH
53:INPUT CLUTCH
61:BRAKE MECHANISM

FIG.7

18:BYPASS CLUTCH
61:BRAKE MECHANISM

3:INPUT SHAFT
4:OUTPUT SHAFT
5:TRANSMISSION CASE
53:INPUT CLUTCH

TRANSMISSION SYSTEM FOR VEHICLE

BACKGROUND OF THE INVENTION

1. Field of the Invention

The present invention relates to a transmission system for a vehicle and more particularly to an automatic transmission whose gear trains are originated from those of a conventional manual transmission.

2. Discussion of Prior Art

Generally, a manual transmission, in which the gear is manually shifted, has an input shaft directly connected to an engine and having a plurality of drive gears and has an output shaft having a plurality of driven gears paired with the drive gears and connected to drive wheels. That is, there are provided a plurality of shift gear trains between the input shaft and the output shaft. When gear is changed, after a clutch is disengaged, changeover mechanisms such as synchromesh mechanism are manually operated to change over paired shift gear trains and then the clutch is engaged. This sequence of manual operations accomplishes a gear shift of a vehicle.

The manual transmission can be converted into an automatic transmission by replacing the sequence of those manual operations with automatic operations using hydraulic actuators. This type of automatic transmission has advantages such as a small number of components, a good transmission efficiency of power and the like, compared to a conventional automatic transmission primarily constituted by planetary gears, friction engagement elements (clutches, brakes) and the like.

This type automatic transmission having a plurality of shift gear trains is-called Automated Manual Transmission (hereinafter, referred to as "AMT"). Japanese Patent Application Laid-open No. Toku-Kai 2000-55184 discloses an AMT including a main clutch (dry type clutch) for changing over the connection of a crank shaft with an input shaft between an engagement condition and a disengagement condition and a bypass clutch (hydraulically operated multiple disc clutch) for transmitting torque from the input shaft to an output shaft to prevent a so-called "torque drop". When the main clutch changes an engagement condition, the bypass clutch is engaged by hydraulic pressure so as to prevent an abrupt drop of output torque when the gear is shifted and thus a shift shock can be alleviated.

An AMT having a bypass clutch has an advantage that an abrupt drop of output torque can be prevented by the engagement of the bypass clutch at gearshifting. Time for switching over power through the bypass clutch at gearshifting is preferably as short as possible. In particular, when the gear is up-shifted during high speed revolution of the engine, it is necessary to synchronously engage a drive gear with a driven gear and reduce the engine speed as fast as possible and as accurately as possible in order to smoothly change over gear trains doing power transmission by the changeover mechanism. That is, in order to accomplish the shift operation swiftly, it is necessary to accurately reduce the revolution of the input shaft, or the engine speed up to a synchronous revolution speed. However, it is difficult to reduce the engine speed swiftly and accurately with the bypass clutch and the engine control using the electronic control throttle valve.

Hence, Japanese Patent Application Laid-open No. Toku-Kai-Hei 4-203669 discloses a technology in which a brake is mounted on the input shaft for the purpose of preventing an over-revolution of the engine when the gear is up-shifted and a synchronizer clutch is operated when the gear is down-shifted.

However, in this technology, since a clutch is released to disconnect power transmission from the engine to the input shaft at gearshifting, particularly, when the gear is shifted from the $1^{st}$ speed ratio to the $2^{nd}$ speed ratio or from the $2^{nd}$ speed ratio to the $3^{rd}$ speed ratio, the change of driving force is so large that a shift shock can not be eliminated.

SUMMARY OF THE INVENTION

It is an object of the present invention to provide an AMT type automatic transmission system having a bypass clutch capable of changing gears swiftly and smoothly.

To achieve the object, the automatic transmission system having an input shaft, an output shaft, a plurality of drive gears mounted on the input shaft, a plurality of driven gears mounted on the output shaft and meshing with the drive gears, a torque converter disposed between a crankshaft of an engine and the input shaft, synchromesh mechanisms for synchronously engaging the drive gears with the driven gears and a shift controller for automatically actuating the synchromesh mechanisms so as to obtain a required gear ratio, comprises a lock-up clutch incorporated in the torque converter between the crankshaft and an output element of the torque converter for connecting the crankshaft with the input shaft, an electronically controlled throttle valve for automatically operating to reduce a rotation speed of the crankshaft when the gear is shifted so as to smoothly synchronize the drive gears with the driven gears, a bypass clutch for transmitting torque from the input shaft to the output shaft when the gear is shifted, while the electronically controlled throttle valve operates to reduce a rotation speed of the engine, an input clutch disposed between the output element of the torque converter and the input shaft for selectively controlling a torque transmission from the output element of the torque converter to the input shaft when the gear is shifted, and a brake mechanism disposed on an impeller shell of the torque converter for additionally reducing a rotational speed of the crankshaft while the electronically controlled throttle valve operates to reduce a rotational speed of the crankshaft so as to smoothly and swiftly engage the drive gears with the driven gears.

DESCRIPTION OF DRAWINGS

FIG. 7 is an enlarged sectional view of FIG. 6;

DETAILED DESCRIPTION OF PREFERRED EMBODIMENT

Figure 1:
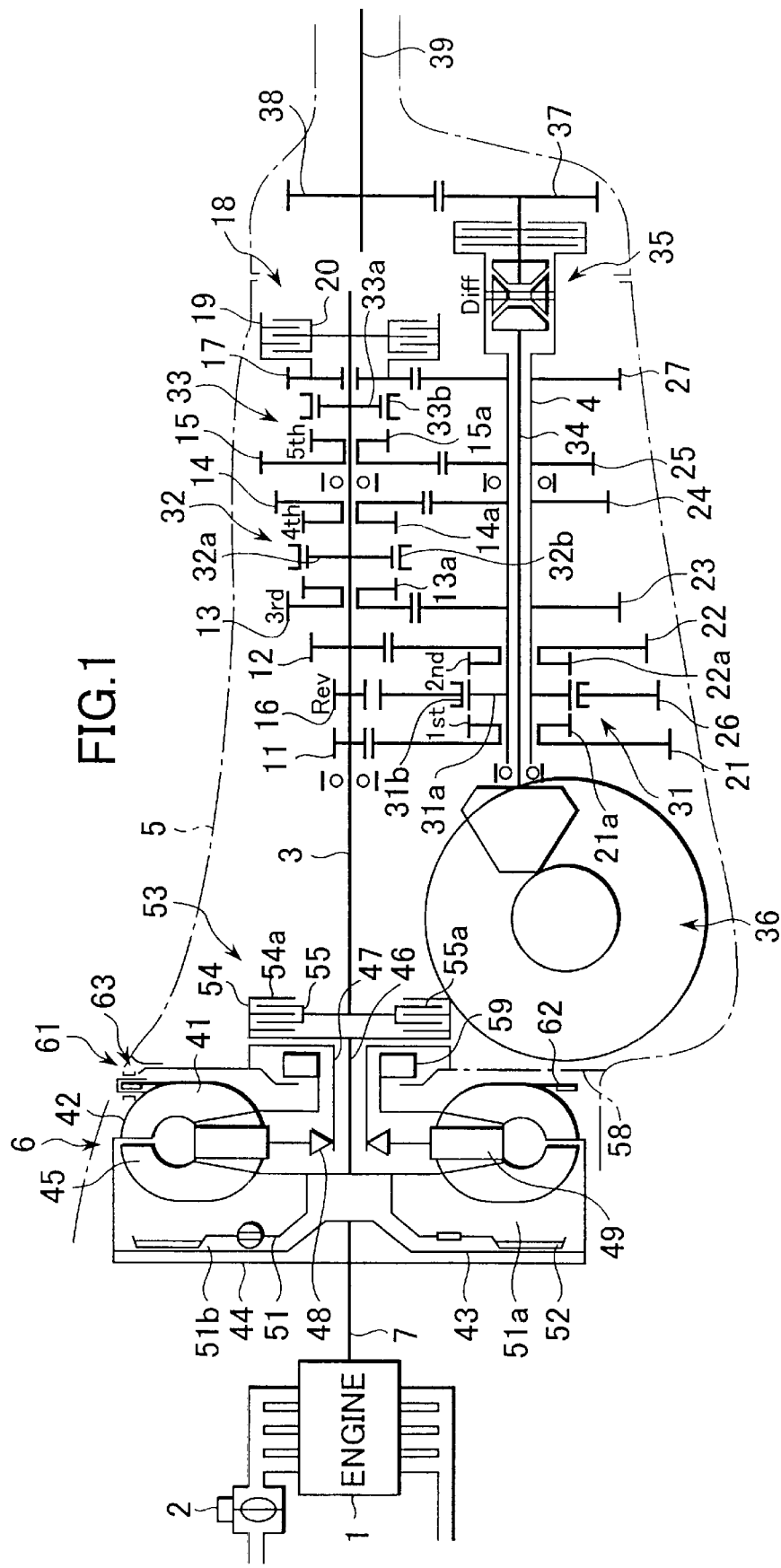
FIG. 1 is a skeleton diagram showing a transmission system for a vehicle according to a first embodiment of the present invention.

Referring now to FIG. 1, an engine 1 is provided with an electronic control throttle valve 2 for electronically controlling engine torque and engine speeds. Normally, the electronic control throttle valve 2 is opened and closed by output signals from an electronic control unit (not shown) according to the amount of depression of an accelerator pedal (not shown) to control the engine 1. Further, when needed, the electronic control throttle valve 2 can be opened and closed to control the engine 1 based on a preestablished table irrespective of the amount of depression of the accelerator pedal.

Further, a transmission system for transmitting power of the engine 1 to driving wheels is exemplified as a transmission system used for a four wheel drive vehicle in this embodiment. The transmission system is mounted on a vehicle in a longitudinal direction thereof and has an input shaft 3 connected to the engine and an output shaft 4 connected to driving wheels and disposed in parallel with the input shaft. These input and output shafts are arranged in a longitudinal direction of the vehicle in a transmission case 5. The input shaft 3 is connected through a torque converter 6 to a crank shaft 7 of the engine 1.

Drive gears 11, 12 for the $1^{st}$ gear ratio and the $2^{nd}$ gear ratio respectively are fixed to the input shaft 3 and further drive gears 13, 14 and 15 for the $3^{rd}$, $4^{th}$ and $5^{th}$ gear ratios respectively are rotatably mounted on the input shaft 3. Further, driven gears 21, 22 for the $1^{st}$ and $2^{nd}$ gear ratios respectively are rotatably mounted on the output shaft 4 and driven gears 23, 24 and 25 for the $3^{rd}$, $4^{th}$ and $5^{th}$ gear ratios respectively are fixed to the output shaft 4. Respective drive gears 11 to 15 mesh with respective driven gears 21 to 25 to form respective shift gear trains. The gear is shifted by changing over the shift gear trains. Further, a drive gear 16 for reverse speed is secured to the input shaft 1.

The output shaft 4 is provided with a first synchromesh mechanism 31 between the driven gear 21 for the $1^{st}$ gear ratio and the driven gear 22 for the $2^{nd}$ gear ratio. The input shaft 3 is provided with a second synchromesh mechanism 32 between the drive gear 33 for the $3^{rd}$ gear ratio and the drive gear 14 for the $4^{th}$ gear ratio and a third synchromesh mechanism 33 adjacent the drive gear 15 for the $5^{th}$ gear ratio.

The synchromesh mechanism 31 includes a synchronizer hub 31a secured to the output shaft 2 and a synchronizer sleeve 31b constantly meshing with the synchronizer hub 31a. When the synchronizer sleeve 31b meshes with a spline 21a integrally formed with the driven gear 21 for the $1^{st}$ gear ratio, the gear ratio is established to the $1^{st}$ gear ratio and when the synchronizer sleeve 31b meshes with a spline 22a integrally formed with the driven gear 22 for the $2^{nd}$ gear ratio, the gear ratio is established to the $2^{nd}$ gear ratio.

Other synchromesh mechanisms 32, 33 include synchronizer hubs 32a, 33a secured to the input shaft 1 and synchronizer sleeves 32b, 33b constantly meshing with the synchronizer hubs 32a, 33a, respectively. When these synchronizer sleeves 32b, 33b are engaged with either of the corresponding splines 13a, 14a and 15a, the gear ratio is established to either of the $3^{rd}$ to $5^{th}$ gear ratios.

The traveling in an axial direction and engagement with the splines 21a, 22a, 13a, 14a and 15a of the respective synchronizer sleeves 31b, 32b and 33b is performed by a hydraulic actuator (not shown).

The synchronizer sleeve 31b of the first synchromesh mechanism 31 is provided with a driven gear 26 for reverse speed. Further, an idler gear (not shown) is slidably mounted on an idler shaft (not shown) in parallel with the input and output shafts 3, 4 respectively so as to axially travel between positions where the reverse driving gear 16 is engaged and disengaged with the driven gear 26. Accordingly, when the idler gear travels to mesh with the reverse drive gear 16 and the reverse driven gear 26 while the synchronizer sleeve 31b is a neutral position, the output shaft 4 rotates in a reverse direction.

The output shaft 4 is hollowed around the center thereof and a front wheel output shaft 34 is incorporated in the hollow. The output shaft 4 is connected with the front wheel output shaft 34 through a center differential 35 and the front wheel output shaft 34 is connected with a front wheel drive shaft (not shown) through a front differential 36. Further, the center differential 35 is connected with a rear wheel output shaft 39 through a drive gear 37 and a driven gear 38 and the rear output shaft 39 is connected with a rear wheel drive shaft (not shown) through a rear differential (not shown).

A bypass gear 17 of the drive side is rotatably mounted on the input shaft 3 and a bypass gear 27 of the driven side is secured to the output shaft 4. These gears 17, 27 are constantly in a meshing condition. The input shaft 3 is provided with a bypass clutch 18 which comprises a clutch hub 20 fixed to the input shaft 3 and a clutch drum 19 fixed to the bypass gear 17. The clutch drum 19 is provided with a plurality of clutch discs of the drive side and the clutch hub 20 is provided with a plurality of clutch discs of the driven side. The clutch discs of the drive side are disposed in interleaving relation to the clutch discs of the driven side. Power of the input shaft 3 is transmitted to the output shaft 4 through the bypass clutch 18 by pressing those clutch discs by means of hydraulic pressure in an axial direction. When releasing those clutch discs, power transmission is disconnected between the input shaft 3 and the output shaft 4.

Figure 2:
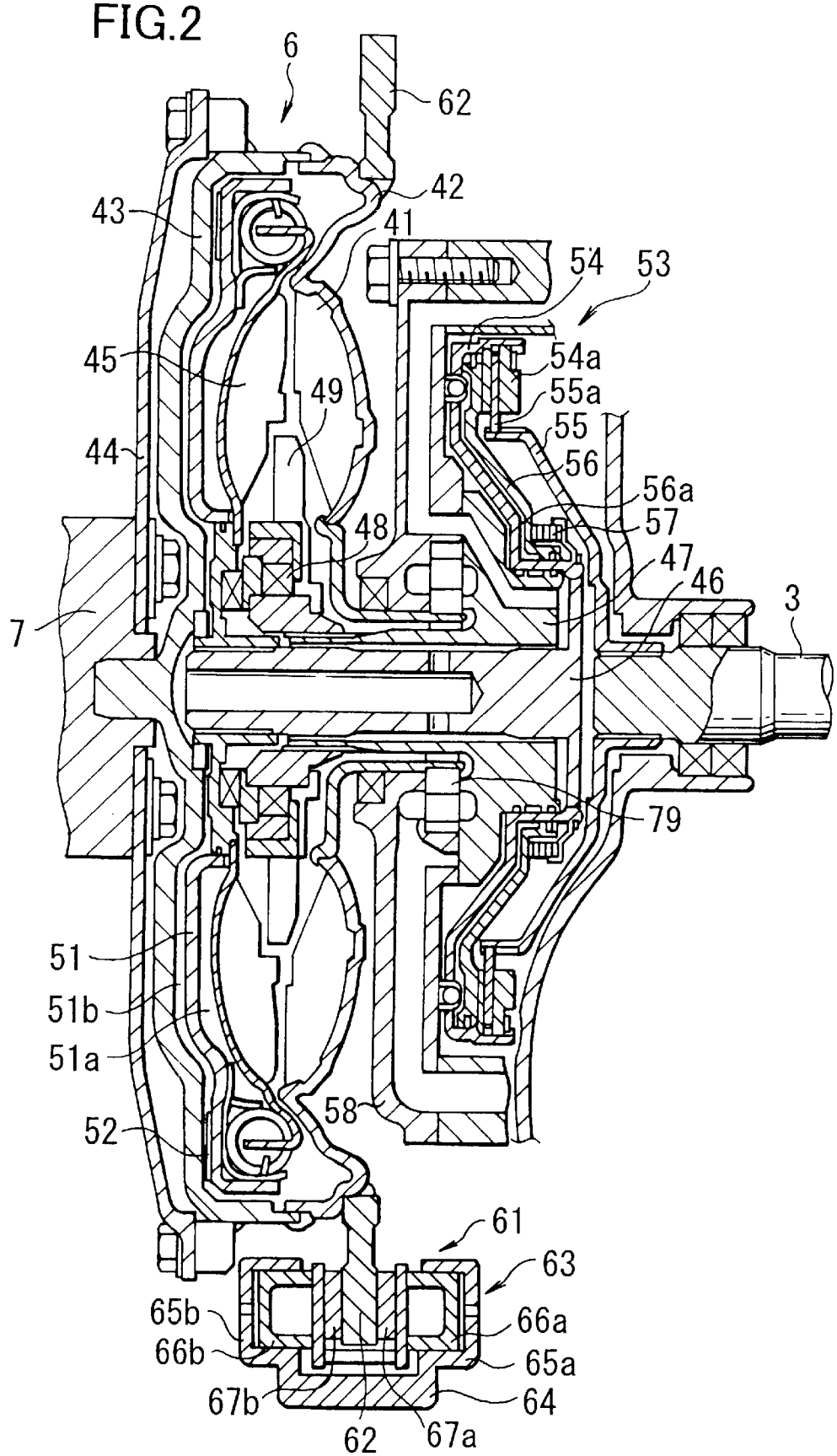
FIG. 2 is an enlarged sectional view of FIG. 1.

As shown in FIG. 2, the torque converter 6 has a pump side outer shell 42 including a pump impeller 41 and a front cover 43 secured to the outer shell 42. The front cover 43 is secured to a drive plate 44 integrally connected with the crankshaft 7. A turbine runner 45 disposed opposite to the pump impeller 41 is directly connected with a turbine shaft 46 through a spline. The turbine shaft 46 is rotatably incorporated in a hollow supporting shaft 47 and a stator 49 is provided on the supporting shaft 47 through an one-way clutch 48. The pump side outer shell 42 and front cover 43 are an input element of the torque converter 6 respectively and the turbine runner 45 and turbine shaft 46 are an output element of the torque converter 6 respectively.

A lock-up clutch 51 is fitted over the turbine shaft 46 in such a manner that power can be transmitted when the lock-up clutch 51 is pressed on the front cover 43. There is provided an apply chamber 51a to which hydraulic pressure is fed to press the loch-up clutch 51 on the front cover 43 on one side of the lock-up clutch 51 and there is provided a release chamber 51b from which hydraulic pressure is released to disengage the lock-up clutch 51 on the other side thereof. When hydraulic pressure is fed to the release chamber 51b and is circulated through the apply chamber 51a, the lock-up clutch 51 is released and the torque converter 6 is operative. On the other hand, when hydraulic pressure is fed to the apply chamber 51a and hydraulic pressure in the release chamber 51b is reduced, a clutch disc 52 of the lock-up clutch 51 is pressed by the front cover 43 to produce a lock-up condition. The lock-up clutch 51 is engaged when vehicle speed exceeds a specified value based on a table parameterizing vehicle speeds and accelerator pedal opening angles. Thus, power of the crankshaft 7 is transmitted to the turbine shaft 46 through the torque converter 6 or the lock-up clutch 51.

There is provided an input clutch 53 between the turbine shaft 46 and the input shaft 3. The input clutch 53 comprises a clutch drum 54 fixed to the turbine shaft 46 and a clutch hub 55 secured to the input shaft 3 through a spline. When a clutch drive disc 54a mounted on the clutch drum 54 is engaged with a clutch driven disc 55a mounted on the clutch hub 55, the turbine shaft 46 is connected with the input shaft 3. When the engagement is released, the turbine shaft 46 is disconnected from the input shaft 3.

As shown in FIG. 2, a clutch piston 56 is mounted in the clutch drum 54. When hydraulic pressure is supplied to an oil chamber 56a, the clutch drive disc 54a is engaged with the clutch driven disc 55a and when hydraulic pressure is stopped to be supplied, the engagement is released by the spring force of spring member 57.

An oil pump 59 is incorporated in a supporting wall 58 connected with the transmission case 5. A rotor of the oil pump 59 is driveably connected with an extension member of the pump side outer shell 42 of the torque converter 6 and is driven by the crankshaft 7 through the pump side outer shell 42. Hydraulic fluid discharged from the oil pump 59 is supplied to the torque converter 6, the bypass clutch 18, the input clutch 53, hydraulically operated devices such as the aforesaid hydraulic actuators and lubricating parts after being converted into a hydraulic fluid with a specified hydraulic pressure for each device.

There is provided a brake mechanism 61 outside of the outer shell 42 on the pump side. The brake mechanism 61 has a brake disc 82 secured to the outer shell 42 and a caliper 63 for braking the brake disc 62 by clamping the disc in between. The caliper 63 is mounted on the transmission case 5.

As shown in FIG. 2, the caliper 63 is mounted on a caliper body 64 secured to the transmission case 5. The caliper body 64 includes two hydraulic cylinders 65a and 65b which are provided opposite to each other. The respective hydraulic cylinders 65a, 65b have hydraulic pistons 66a, 66b on which brake pads 67a, 67b are installed respectively so as to interleave the brake disc 62.

Accordingly, when working fluid is supplied to the respective hydraulic cylinders 65a, 65b in accordance with vehicle operating conditions, the brake disc 62 contacts the brake pads 67a, 67b to reduce the rotation speed of the crankshaft 7. For example, when the brake mechanism 61 is operated at an up-shift, since the electronic control throttle valve 2 additionally reduces the engine speed, the rotation speed of the crankshaft 7 descends to a specified value for a very short time. As a result, the shift operation can be performed smoothly and swiftly. Further, since a braking force is applied to the crankshaft 7 at a radially remote place on the outer shell 42 of the torque converter 6, a large braking force can be obtained without applying a large pressing force on the brake pads 67a, 67b.

Figure 3:
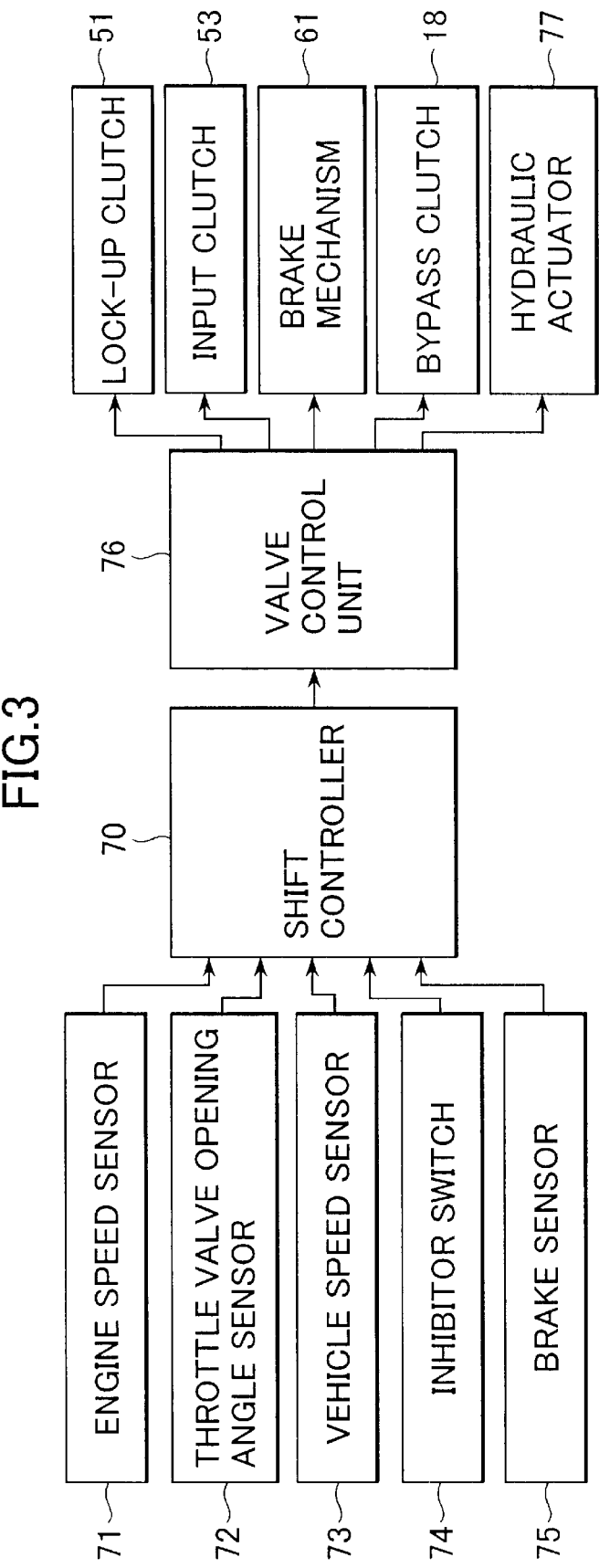
FIG. 3 is a block diagram showing a control circuit of a transmission system for a vehicle according to the first embodiment of the present invention.

Referring to FIG. 3, a shift controller 70 inputs a rotational speed of the crankshaft 7 from an engine speed sensor 71, a throttle valve opening angle from a throttle valve opening angle sensor 72, a traveling speed of a vehicle from a vehicle speed sensor 73, a range of the automatic transmission like drive range, neutral range from an inhibitor switch 74 and a brake signal indicative of an abrupt braking from a brake sensor 75 by detecting a depression amount of a brake pedal.

The bypass clutch 18, the lock-up clutch 51 and the input clutch 53 are actuated by means of hydraulic pressure regulated by electromagnetic valves provided in a valve control unit 76. The valve control unit 76 is controlled by signals from the shift controller 70. Further, the synchronizer sleeves 31b, 32b and 33b are actuated for engagement in the axial direction by a plurality of hydraulic actuators 77. Regulated hydraulic pressure is supplied to the respective actuators 77 from the electromagnetic valves provided in the valve control unit 76. The shift controller has a memory in which a shift table parameterizing throttle opening angles, vehicle speeds and the like is stored so as to automatically perform a shift operation by detecting actual engine speeds, accelerator pedal opening angles, vehicle speeds, rotation speed of the output shaft, gear positions and the like.

When a selector lever provided in the passenger compartment is positioned at a neutral range under an engine operative condition, both lock-up clutch 71 and input clutch 73 are established in a released condition.

When the selector lever selects a forward drive range, since the selector lever is interlocked with one of manual valves (not shown) of a hydraulic control mechanism incorporated in the transmission system, the input clutch 53 is engaged by hydraulic pressure supplied thereto. At this moment, there is a sequence to operate the input clutch 53. First, an hydraulic actuator slides the synchronizer sleeve 31b and engages it with the spline 21a to place this shift gear train for the $1^{st}$ gear ratio in a power transmitting condition. After that, hydraulic pressure is supplied so as to engage the input clutch 53. Thus, engine power is transmitted to the input shaft 3 through the torque converter 6 and the input clutch 53 to drive the vehicle. Then, engine torque transmitted to the input shaft 3 is amplified by the torque converter 6.

As the accelerator pedal opening angle increases, the electronic control throttle valve 2 operates and up-shifts are performed. When the vehicle speed goes down or when the accelerator pedal is suddenly depressed (kick down), downshifts are performed. The gear is shifted automatically according to shift schedules programmed in a shift control section.

At up-shifting, while the input clutch 53 is retained in such a condition as being able to variably transmit torque according to vehicle operating conditions, the bypass clutch 18 starts to be engaged and then is controlled so as to gradually increase the transmission torque of the bypass clutch 18. For example, the engine speed is reduced to a specified value corresponding to the $2^{nd}$ gear ratio by controlling the electronic control valve 2 to synchronize and engage the synchronizer sleeve 31b with the spline 22a of the driven gear 22 of $2^{nd}$ gear ratio. At this moment, when the gear is changed, power is transmitted from the input shaft 3 to the output shaft 4 through the bypass gears 17 and 27 due to the engagement of the bypass clutch 18 without shutting off power of the engine and as a result torque drops can be eliminated at gearshifting.

The input shaft 3 can be synchronously engaged with the output shaft 4 through the bypass clutch 18, while a torque drop between the input shaft 3 and the output shaft 4 is prevented. Further, when the gear is up-shifted, since the rotation speed of the input shaft 3 can be reduced in short time with accuracy to a specified number of revolution by simultaneously operating both the brake mechanism 61 and the electronic control throttle valve 2, fast synchronous engagements are obtained when the gear trains steps from a low speed stage to a high speed stage. On the other hand, when the gear is down-shifted, since the engine speed can be raised by the control of the electronic control throttle valve 2, the input shaft 3 can be synchronously and smoothly engaged with the output shaft 4.

When the vehicle starts, the input clutch 53 is in an engaged condition. Further, when the vehicle travels, the input clutch 53 is also in an engaged condition. When the gear is down-shifted, if the input clutch 53 stays in an engaged condition, drag torque retains engine speed in a reduced condition. Hence, at down-shifting, the input clutch 53 is controlled so as to be partially engaged, that is, in a slip condition and as a result it becomes possible to increase the engine speed at down-shifting.

For example, when the vehicle travels at low or medium speed under a high speed stage such as the $4^{th}$ or $5^{th}$ speeds, the riding comfort is exacerbated due to the effect of torque fluctuation at low engine speeds. Under these traveling conditions, when the input clutch 53 is engaged in a minimum torque transmission condition, the input clutch 53 acts as a dumper and the torque fluctuation is prevented from being transmitted to a vehicle drive train. As a result, the riding comfort is prevented from being exacerbated.

Since the lock-up clutch 51 is incorporated in the torque converter 6, in order to supply hydraulic pressure from an electromagnetic valve provided in the valve control unit 76 to the lock-up clutch 51, a long oil delivery path is required. Further, since the lock-up clutch 51 is operated by a pressure difference between the apply chamber 51a and the release chamber 51b, in case where oil temperature is low, it takes a long time 14 for the lock-up clutch 51 to change over from an engaged condition to a released condition due to the effect of viscosity of working fluid. As a result, when the engine speed goes down while the engine is connected with the input shaft 3, engine stalls may occur.

On the other hand, the input clutch 53 is designed such that when hydraulic pressure is supplied to the oil chamber 56a, the input clutch 53 is engaged and when oil is discharged from the oil chamber 56a, the input clutch 53 is released. Furthermore, since the input clutch 53 is disposed in a place close to an electromagnetic valve provided in the valve control unit 76, the oil delivery path from the electromagnetic valve to the input clutch 53 is shorter than that from the electromagnetic valve to the lock-up clutch 51 and as a result the input clutch 53 has a better responsibility than the lock-up clutch 51. Therefore, when abrupt braking is applied, the input clutch 53 is released while the lock-up clutch 51 is engaged. As a result, when the engine speed goes down abruptly, engine stalls can be prevented.

Figure 4:
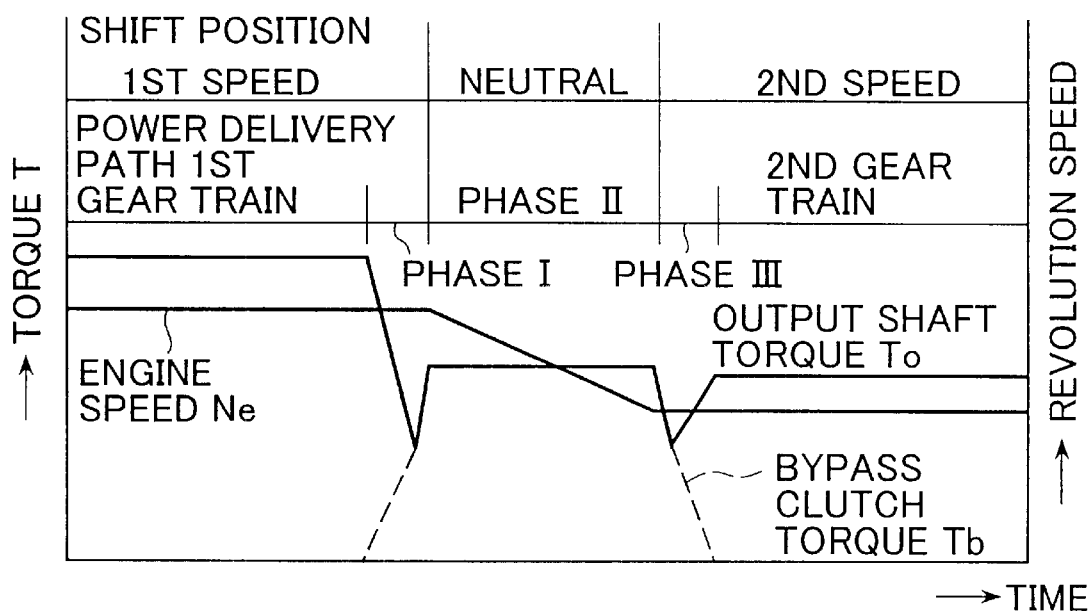
FIG. 4 is a timing chart showing a change of torque of an output shaft versus engine speeds at an up-shift from the $1^{st}$ to $2^{nd}$ gear ratio.

FIG. 4 is a timing chart showing a time-versus change of a torque To of the output shaft 4 and a time-versus change of an engine speed Ne when the gear is up-shifted from the $1^{st}$ to $2^{nd}$ gear ratio.

In the drawing, a shift position indicates a position of the synchronizer sleeve 31b. That is, the state "$1^{st}$ speed" indicates that the synchronizer sleeve 31b is engaged with the driven gear 21 through the spline 21a, the state "Neutral" indicates that the synchronizer sleeve 31b is disengaged from the spline 21a, and the state "$2^{nd}$ speed" indicates that the synchronizer sleeve 31b is engaged with the driven gear 22 through the spline 22a.

In a power delivery path "$1^{st}$ gear train", engine power is transmitted to the output shaft only through the $1^{st}$ speed gear train and in a power delivery path "Phase I", engine power is transmitted to the output shaft through both the $1^{st}$ speed gear train and the bypass clutch 18. In a power delivery path "Phase II", engine power is transmitted only through the bypass clutch 18. Further, in a power delivery path "Phase III", power is transmitted through both the $2^{nd}$ speed gear train and the bypass clutch 18 and in a power delivery path "$2^{nd}$ gear train", engine power is transmitted only through the $2^{nd}$ speed gear train.

When a gear shift is performed, first, hydraulic pressure is supplied to the bypass clutch 18, a condition where power is transmitted through the $1^{st}$ speed gear train formed by the drive gear 11 and the driven gear 21 changes to a condition of Phase I where power is transmitted through two power delivery paths, the $1^{st}$ speed gear train and the gear train of the bypass gears 17 and 27.

Since the drive gear 11 of the $1^{st}$ gear ratio driveably meshes with the driven gear 21 and on the other hand the bypass gear 17 drives the bypass gear 27, the bypass gear 17 rotates at a higher speed than the drive gear 11 due to the difference of gear ratios. As a result, torque is transmitted through the gear train of the bypass gears 17, 27 according to the engagement condition of the bypass clutch 18.

Next, the synchronizer sleeve 31b transfers to a neutral position, namely the Phase II condition, in which the synchronizer sleeve 31b meshes only with the synchronizer hub 31a. Under the condition, power is transmitted from the input shaft 3 to the output shaft 4 through the gear train of the bypass gears 17, 27 and at the same time the rotational speed of the input shaft 3 is reduced by the closing operation of the electronic control throttle valve 2 to synchronize the input shaft 3 with the output shaft 4. At this moment, the brake mechanism 61 operates to brake the crankshaft 7 and as a result time for synchronizing can be shortened.

When the engine rotational speed is reduced to a level corresponding to the $2^{nd}$ speed, a condition where the synchronizer sleeve 31b meshes only with the synchronizer hub 31a transfers to a condition where the synchronizer sleeve 31b meshes with the spline 22a. As a result, in this condition, Phase III condition, the power delivery path has two paths, one is a shift gear train of the $2^{nd}$ speed and another is a gear train of the bypass gears 17, 27. When the synchronizer sleeve 31b comes into a meshing condition with the spline 22a, the braking torque of the brake mechanism 61 is released and no braking force is applied to the crankshaft 7.

Under the Phase III condition, when hydraulic pressure fed to the bypass clutch 18 is drained to release the bypass clutch 18, an up-shift to the $2^{nd}$ speed is accomplished and then power is transmitted from the input shaft 3 to the output shaft 4 through the gear train of the $2^{rd}$ speed.

Thus, the bypass clutch control and the engine control are performed simultaneously and when the rotational speed of the engine is reduced to a speed corresponding to the $2^{nd}$ speed, the synchronizer sleeve 31b meshes with the spline 22a. As a result, no gear clash occurs and the shift operation can be accomplished smoothly. Further, when the synchronizer sleeve 31b is at a neutral position, since power is transmitted through the bypass clutch 18, so-called "torque drop" can be reduced. Particularly, the torque drop becomes noticeable when the gear is up-shifted from the $1^{st}$ speed to the $2^{nd}$ speed or from the $2^{nd}$ speed to the $3^{rd}$ speed.

Referring to FIG. 4, two-dots chain lines indicate a change of engine speeds when the brake mechanism 61 is inoperative and solid lines indicate a change of engine speeds when the brake mechanism 61 is operative. As understood from the difference of these changes, when the brake mechanism 61 is operative, since time for transmitting power from the input shaft 3 to the output shaft 4 only through the bypass clutch 18, that is, time in the Phase II condition can be shortened surely and accurately, the total time for gearshifting can be shortened.

FIG. 4 shows a change of engine speeds and torque when the gear is up-shifted from the $1^{st}$ to $2^{nd}$ gear ratio. Other up-shift operations such as an operation from the $2^{nd}$ to $3^{rd}$ gear ratios and the like are done in a similar manner. As understood from FIG. 4, a gearshift operation at up-shifting can be done swiftly. In case where the gear ratio of the bypass gears 17, 27 of the bypass clutch 18 is selected to a value corresponding to that of the $4^{th}$ speed, when the gear is up-shifted to high speed stages such as from the $4^{th}$ speed to the $5^{th}$ speed, the gear may be shifted without involving the bypass clutch 18 (with the bypass clutch 18 released), because the gear ratio of the bypass gears is near to that of the $4^{th}$ speed and accordingly the drop of driving force is small.

On the other hand, when the gear is down-shifted, since the drop of output torque is not so noticeable, the input clutch 53 may be operated to shut off power transmission to the input shaft 3. Further, also when the gear is down-shifted, the bypass clutch 18 may be engaged so as to change over the control between power deliveries through two paths and power transmission only through the bypass clutch 18 while the engine control and the brake control by the brake mechanism 61 are performed.

Figure 5:
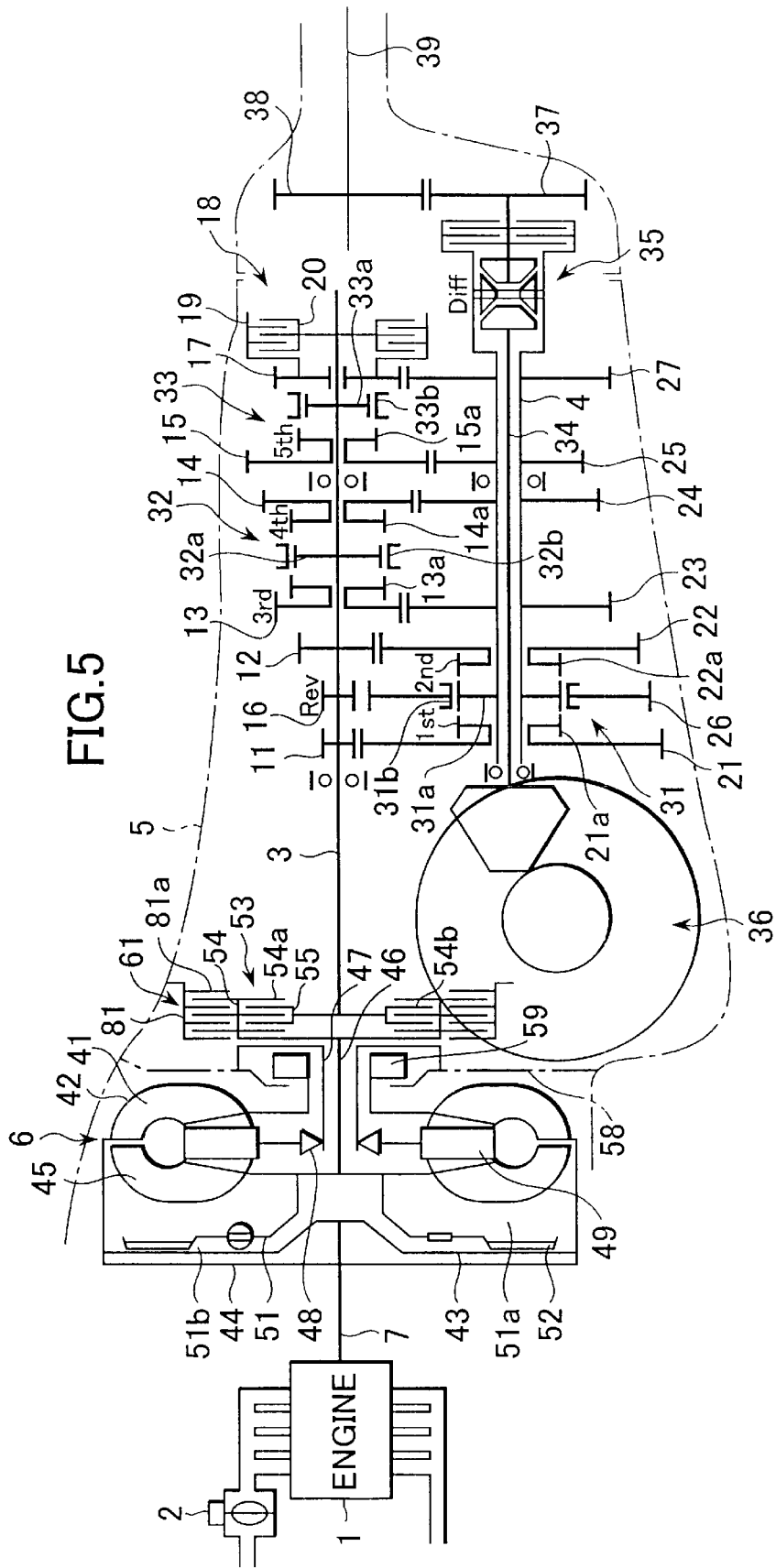
FIG. 5 is a skeleton diagram showing a transmission system for a vehicle according to a second embodiment of the present invention.

FIG. 5 is a skeleton diagram showing a transmission system according to a second embodiment of the present invention. The components identical to the first embodiment are denoted by identical reference numbers and are not described in detail.

In this transmission system, the brake mechanism 61 is provided on an outer side of the clutch drum 54 of the input clutch 53. A plurality of spline grooves 81 having grooves in an axial direction are circumferentially formed integrally with the transmission case 5 and a plurality of driven discs 81a are fitted to the spline grooves 81. Further, a plurality of drive discs 54b are driveably mounted on spline teeth formed on the outer side of the clutch drum 54. The drive discs 54b contact the driven discs 81a in an interleaving manner with each other. When hydraulic pressure is applied to these drive discs 54b and the driven discs 81a, an engagement force generates between these discs. Brake torque of the brake mechanism 61 is regulated by adjusting the engagement force with hydraulic pressure. As shown in FIG. 5, since components of the brake mechanism 61 is coaxially formed on an outer periphery of the clutch drum 54 of the input clutch 53, the axial length of the-transmission system can be shortened. In order to smoothly control the rotation of the crankshaft 7 of the transmission system, the brake mechanism 61 is operated while the lock-up clutch 51 which is directly connected with the crankshaft 7 is engaged. Thus, since the input clutch 53 is driveably connected with the crankshaft 7, engine power can be directly transmitted to the input shaft 3 by engaging the input clutch 53. As a result, the gear can be shifted smoothly and fuel economy in medium to high speed ranges can be enhanced due to very small loss of power transmission.

Figure 6:
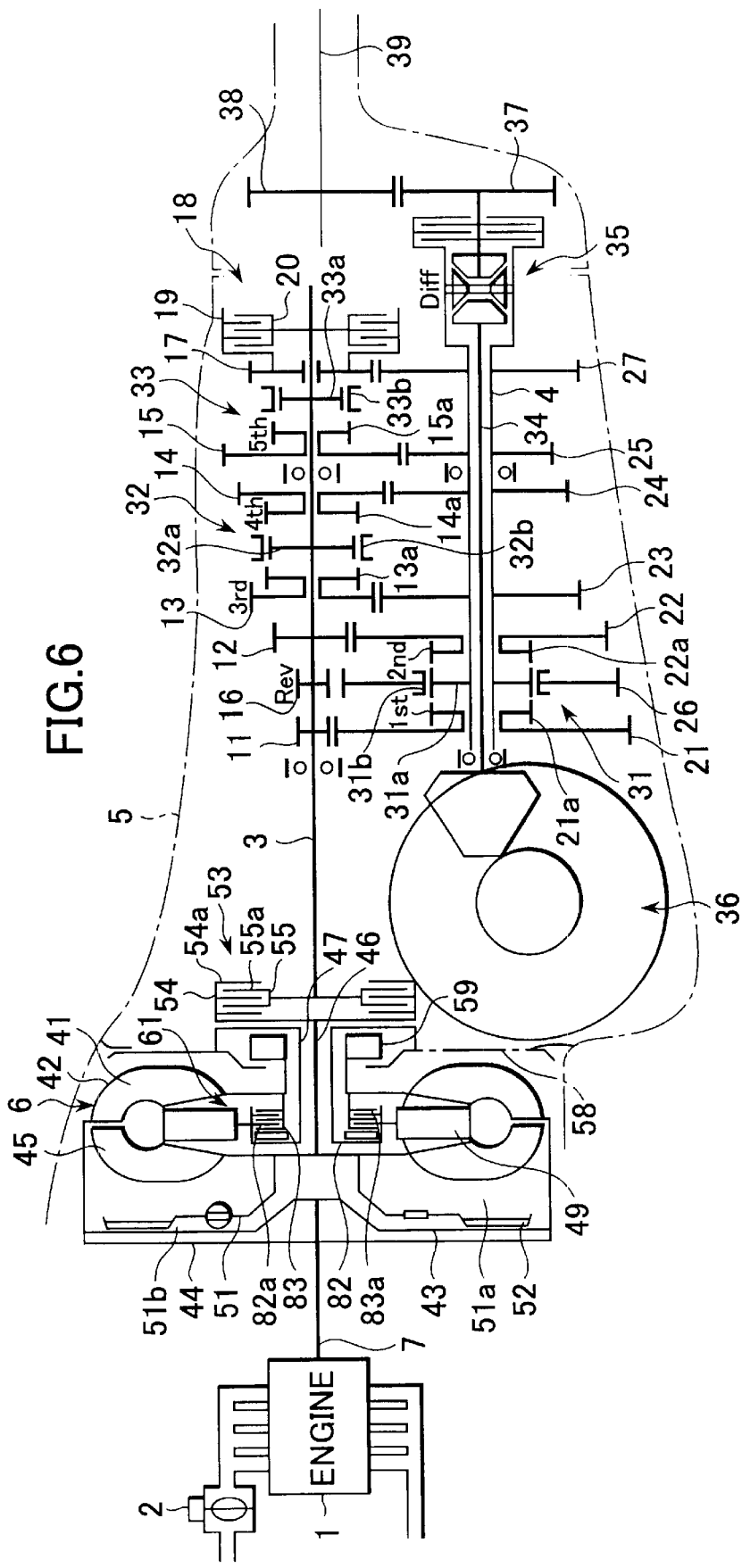
FIG. 6 is a skeleton diagram showing a transmission system for a vehicle according to a third embodiment of the present invention.
Figure 7:
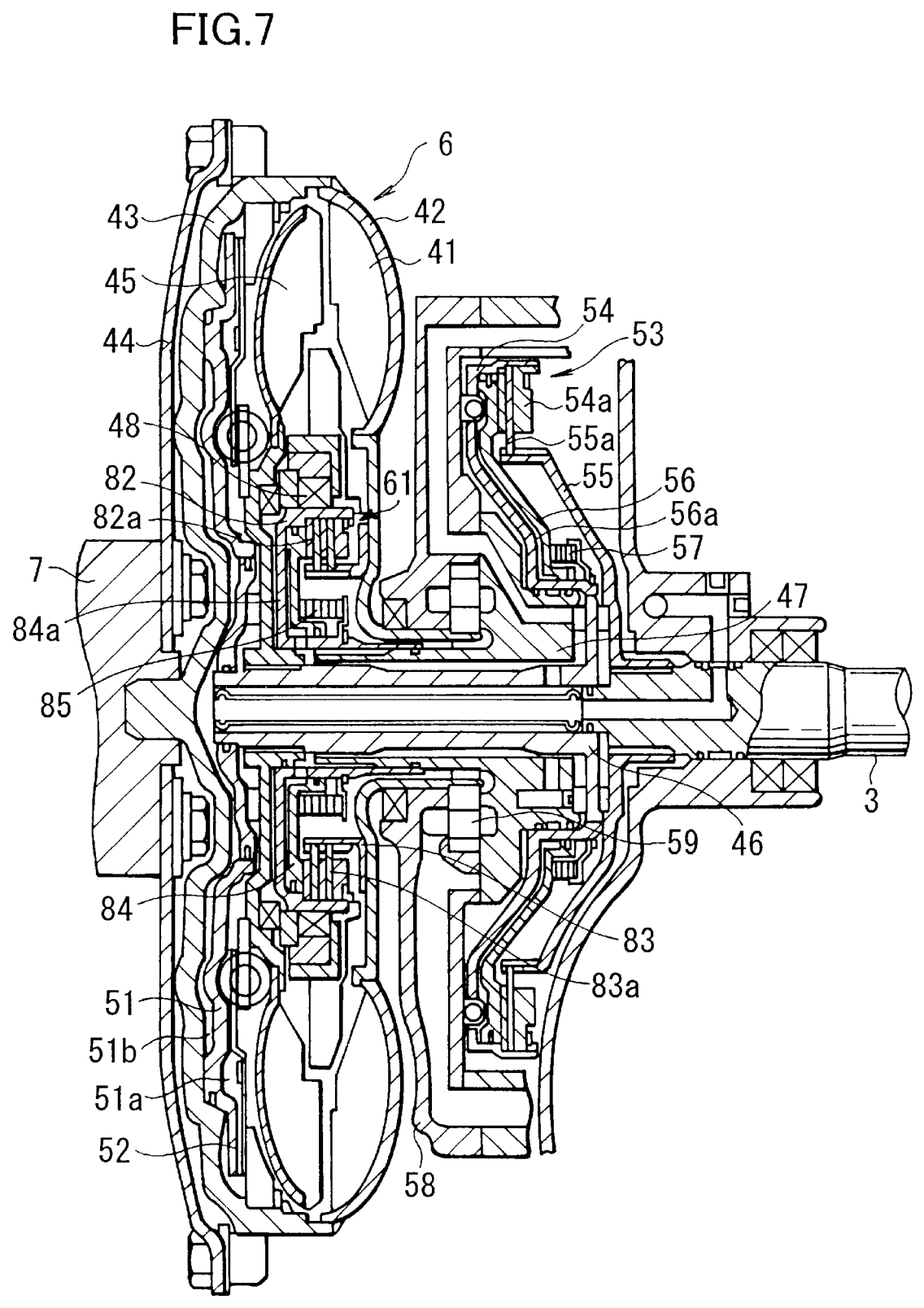

In case of the transmission system of a third embodiment shown in FIG. 6 and FIG. 7, the brake mechanism 61 is disposed between the stator 49 of the torque converter 6 and the supporting shaft 47 for supporting a reaction torque of the stator 49. The brake mechanism 61 includes a brake drum 82 secured to the supporting shaft 47 through spline fitting and a brake hub 83 fixed to the pump side outer shell 42. Brake driven discs 82a are mounted on the brake drum 82 and brake drive discs 83a are driveably mounted on the brake hub 83. Further, the brake driven discs 82a have contact with the brake drive discs 83a.

A brake piston 84 is slidably incorporated in the brake drum 82. When working fluid is fed to an oil chamber 84a, the brake discs 82a and 83a generate an engagement force. Braking torque of the brake mechanism 61 is regulated by adjusting the engagement force of the brake discs 82a, 83a. The brake piston 84 is subjected to a biasing force in a releasing direction by a spring member 85.

In this transmission system, since the brake mechanism 61 is disposed inside of the stator 49 of the torque converter 6, the axial or longitudinal size of the transmission system can be shortened. As a result, the transmission system can be introduced into a variety of types of transmission.

Figure 8:
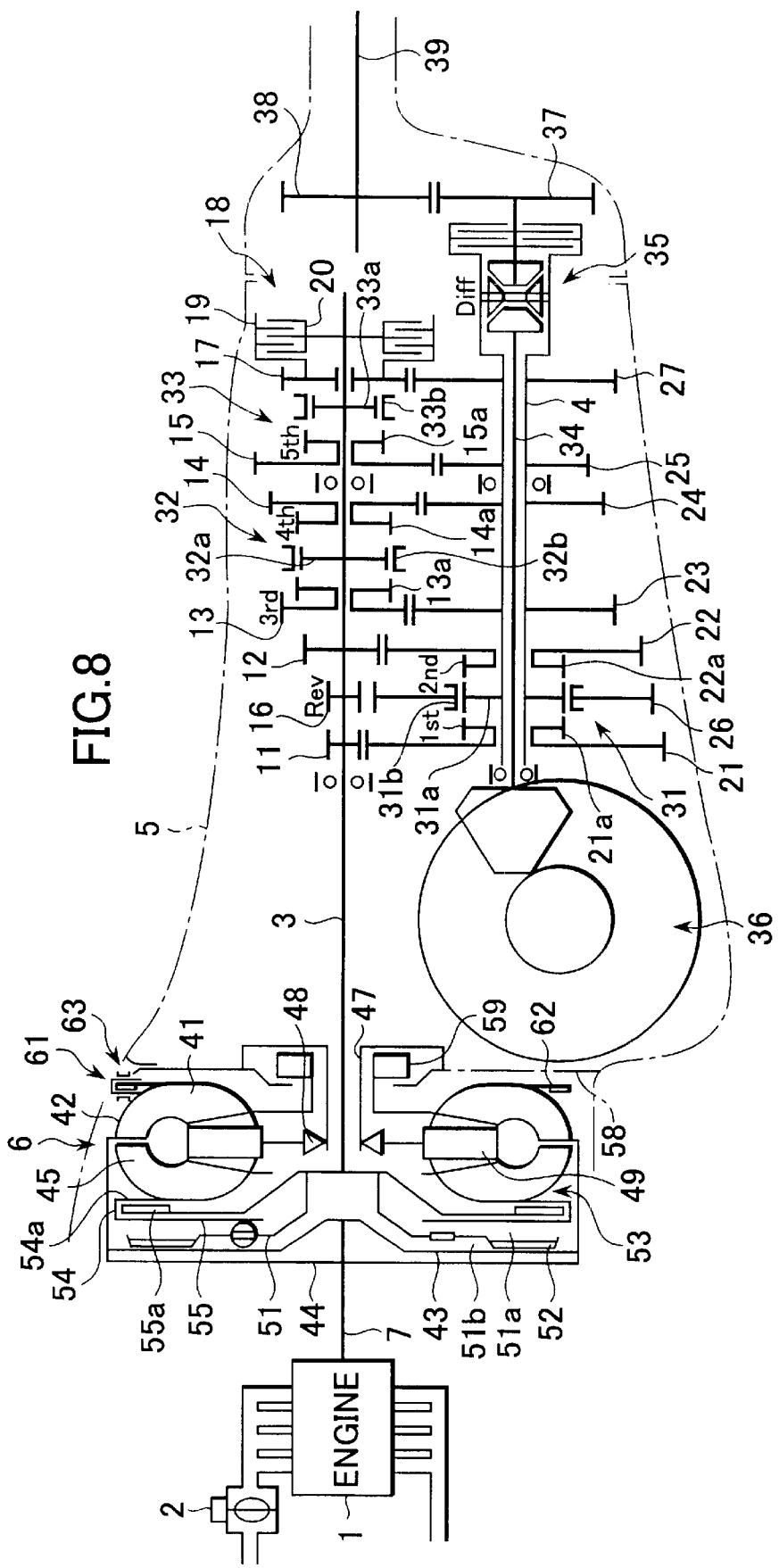
FIG. 8 is a skeleton diagram showing a transmission system for a vehicle according to a fourth embodiment of the present invention.

FIG. 8 is a skeleton diagram showing a transmission system according to a fourth embodiment. In this transmission system, the brake mechanism 61 is formed between the pump side outer shell 42 of the torque converter 6 and the transmission case in the same manner as in the first embodiment. On the other hand, the lock-up clutch 51 is driveably connected with the input shaft 3. When the lock-up clutch 51 is engaged, the crankshaft 7 is directly connected with the input shaft 3. The input clutch 53 is incorporated between the turbine runner 45 of an output element of the torque converter 6 and the lock-up clutch 51.

The input clutch 53 comprises a clutch drum 54 fixed to the turbine runner 45, a clutch drive disc 54a mounted on the clutch drum 54, a clutch hub 55 which is connected to the input shaft 3 and a clutch driven disc 55a mounted on the clutch hub 55. The rotation of the turbine runner 45 is transmitted to the input shaft 3 through the input clutch 53. Accordingly, in case where the input clutch 53 is disengaged and the lock-up clutch 51 is engaged, or in case where the input clutch 53 is engaged and the lock-up clutch 51 is released, the rotation of the crankshaft 7 is directly transferred to the input shaft 3.

Figure 9:
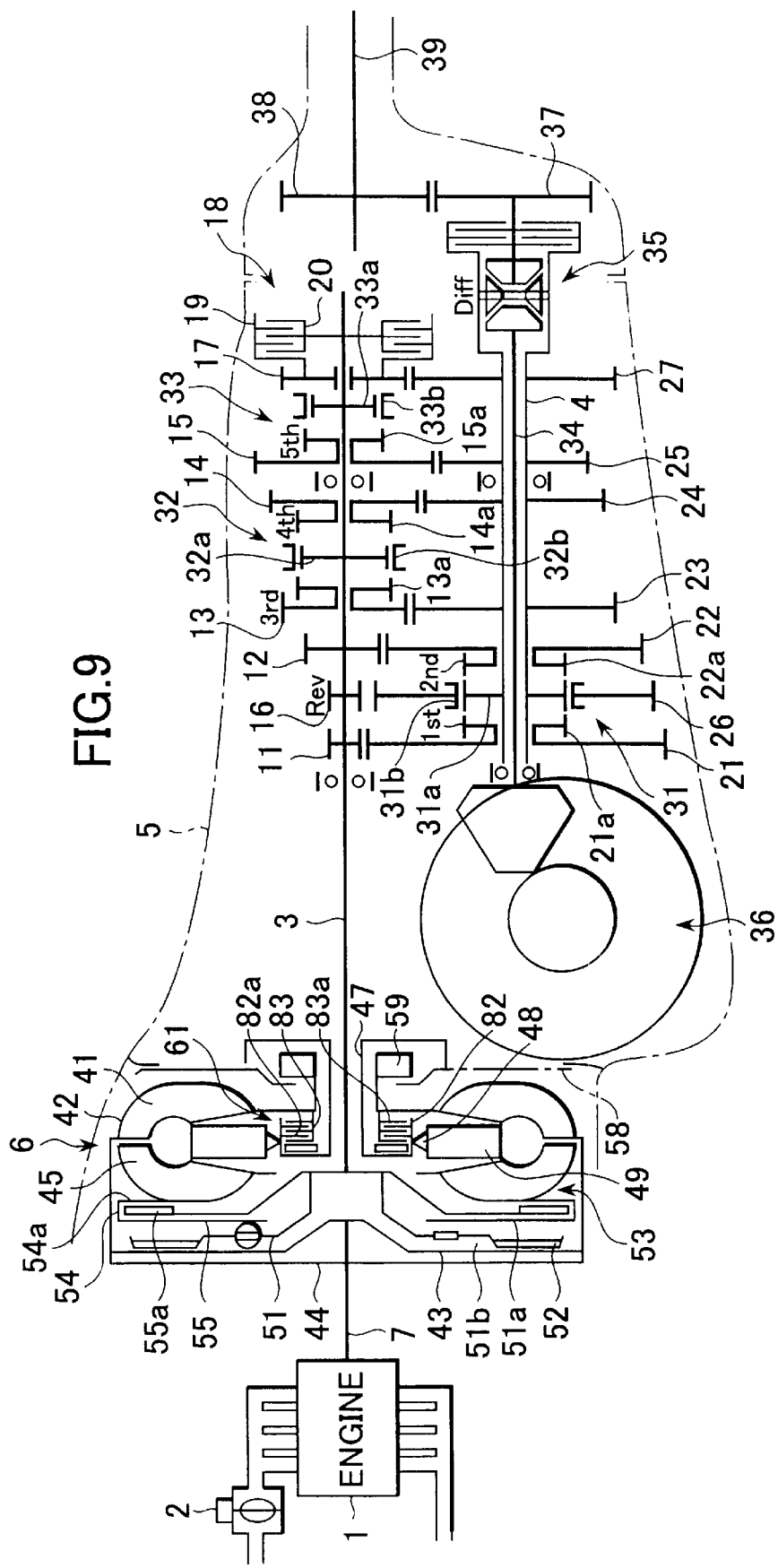
FIG. 9 is a skeleton diagram showing a transmission system for a vehicle according to a fifth embodiment of the present invention.

FIG. 9 is a skeleton diagram showing a fifth embodiment of a transmission system.

In this transmission system, the input clutch 53 is disposed between an output element of the turbine runner 45 and an input element of the lock-up clutch 51 in the same manner as in case of FIG. 8 and the brake mechanism 61 is provided on an inner periphery surface of the stator 49 of the torque converter 6.

In these transmission systems shown in FIG. 8 and FIG. 9, since the input clutch 53 and the lock-up clutch 51 are integrally incorporated in the torque converter 6 and the clutch drum of the input clutch 53 is driveably connected with the turbine runner 45, the axial or length of the transmission system can be shortened. As a result, a variety of transmission types, transversely mounted type, longitudinally mounted type and the like, can introduce these transmission systems.

The transmission systems described before in the second, third, fourth and fifth embodiments have automatic transmissions comprising the torque converter 6, the input clutch 53, the brake mechanism 61, a plurality of shift gear trains and the bypass clutch 18 for transmitting torque from the input shaft 3 to the output shaft 4 when needed. These transmission systems perform similar shift operations to the transmission system described in the first embodiment.

Figure 10:
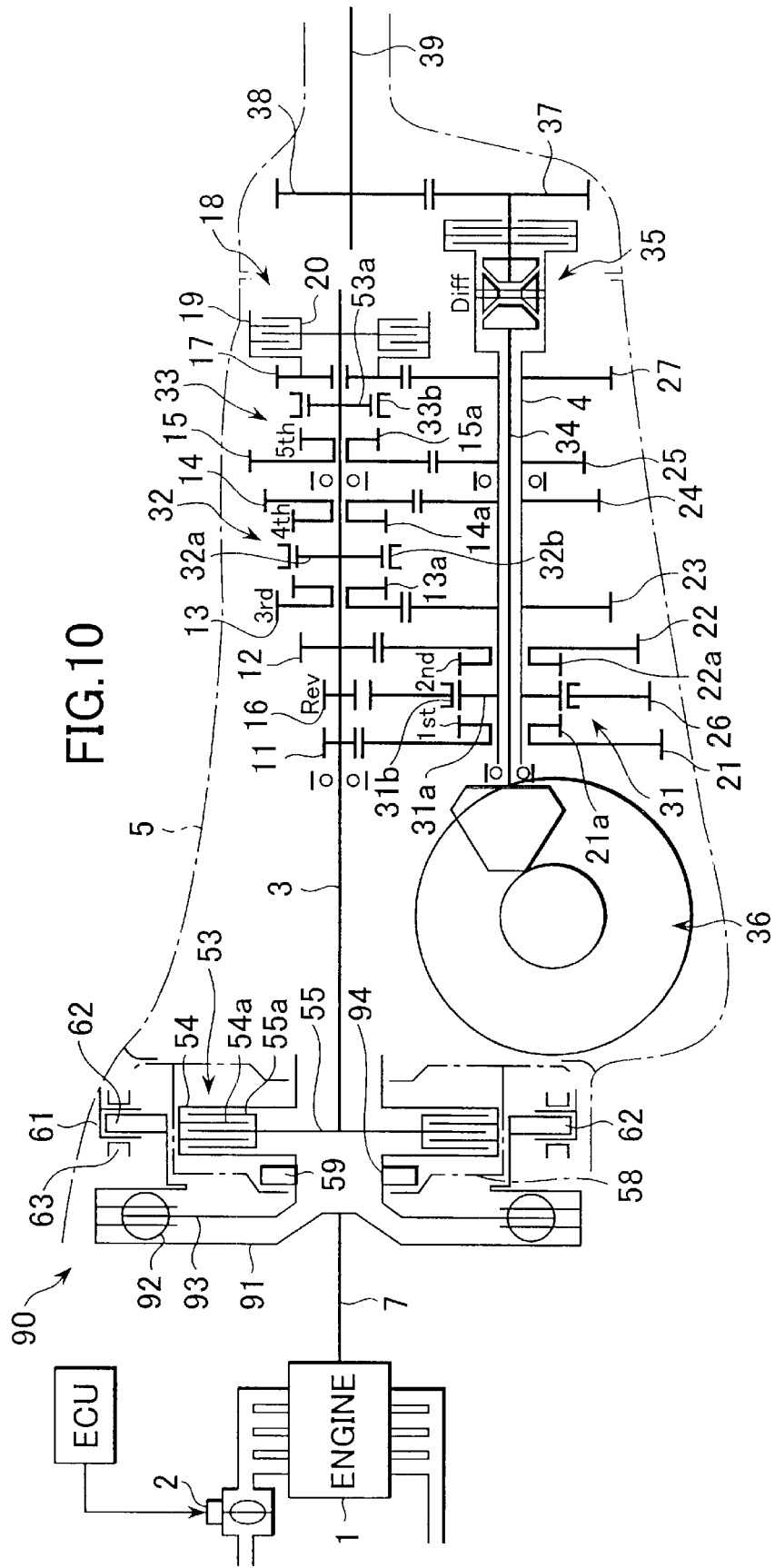
FIG. 10 is a skeleton diagram showing a transmission system for a vehicle according to a sixth embodiment of the present invention.

FIG. 10 shows a transmission system according to a sixth embodiment. The transmission system comprises a flywheel dumper 90, an input clutch 53, a brake mechanism 61, a plurality of shift gear trains and a bypass clutch 18, not including a torque converter.

Figure 11:
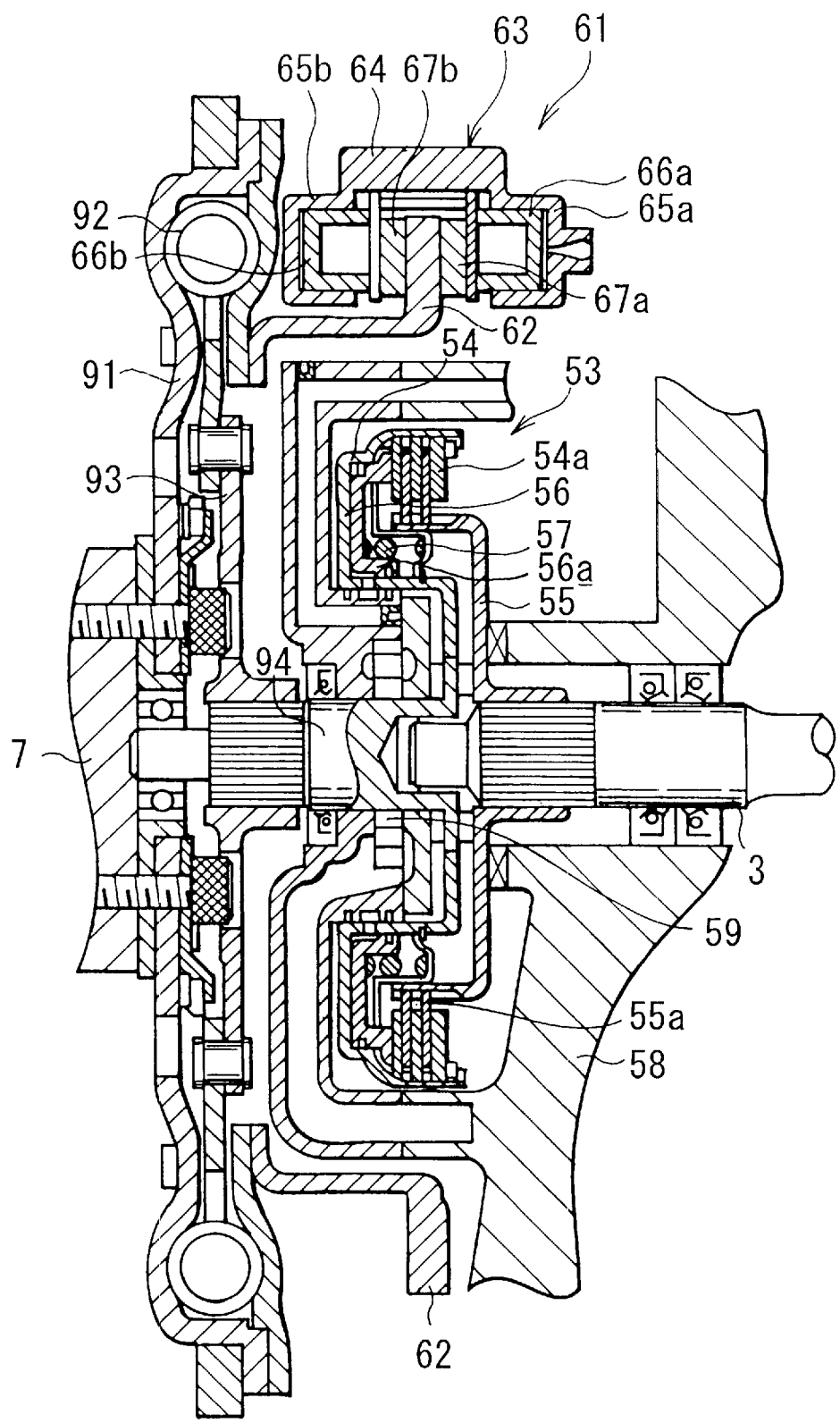
FIG. 11 is an enlarged sectional view of FIG. 10.

As shown in FIG. 10 and FIG. 11, the flywheel dumper 90 comprises a drive plate 91 driveably secured to the crankshaft 7 and a driven plate 93 connected with the drive plate through a spring member 92 for absorbing shocks. The driven plate is spline-fitted over a rotation shaft 94 which is rotatably supported by the supporting wall 58 of the transmission case 5.

The input clutch 53 includes the clutch drum 54 secured to the rotation shaft 94 and the clutch hub 55 secured to the input shaft 3. Similarly to the first embodiment, there are provided clutch drive discs 54a and clutch driven discs 55a interleaving relationship with each other between the clutch drum 54 and the clutch hub 55. When hydraulic pressure is supplied to the oil chamber 56a, the clutch piston 56 presses the clutch discs 54a, 55a and as a result an engagement force generates between the clutch discs 54a, 55a, thus the input clutch 53 being engaged. Further, according to the magnitude of hydraulic pressure applied to the oil chamber 56a, the input clutch 53 can retained in any conditions from a partially engaged or slip condition to a fully engaged condition. When hydraulic pressure is stopped to be supplied to the oil chamber 56a, the engagement force is lost by the spring member 57, the input clutch 53 being released.

With respect to the brake mechanism, the brake disc 62 is fixed to an extension member of the drive plate 91. Accordingly, the brake disc 62 is directly connected with the crankshaft 7. Except this, the construction of the brake mechanism 61 is similar to those of the first and fourth embodiments.

Figure 12:
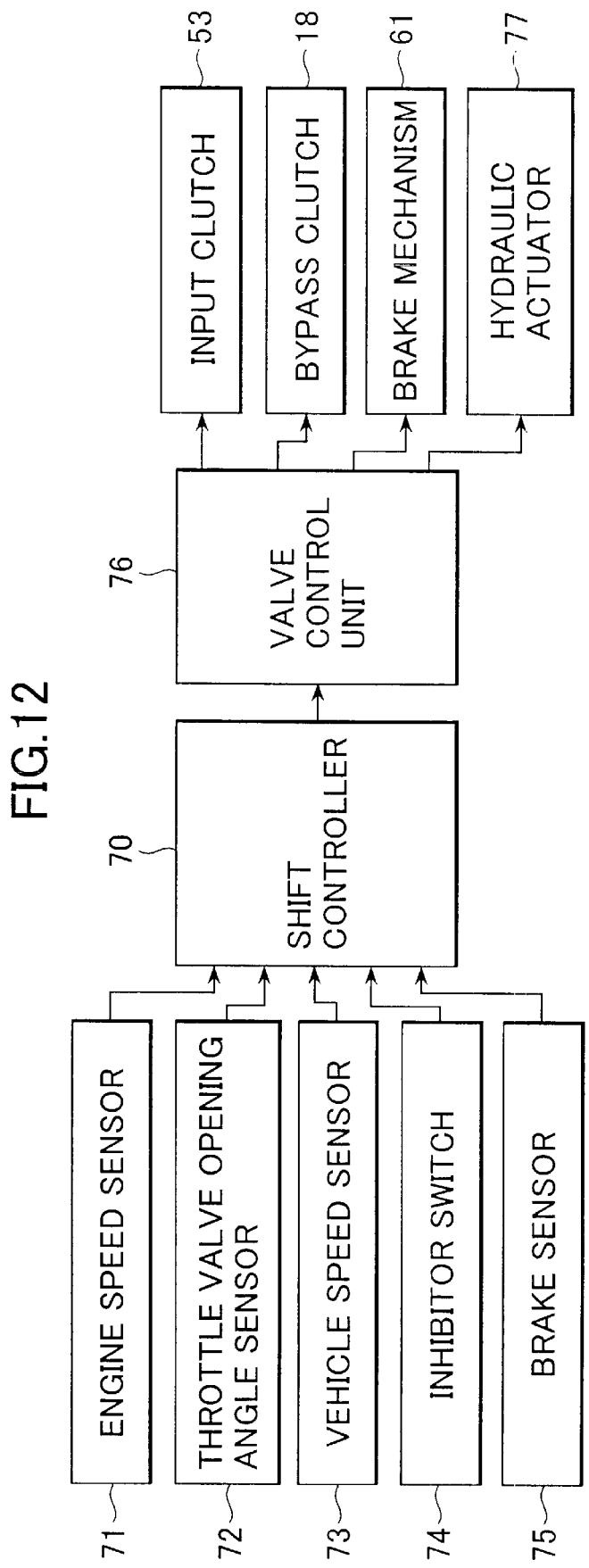
FIG. 12 is a block diagram showing a control circuit of a transmission system for a vehicle according to the sixth embodiment of the present invention.

FIG. 12 is a block diagram showing a shift control of a transmission system according to the sixth embodiment of the present invention. Except that the lock-up clutch 51 is deleted, other components such as the input clutch 53, the bypass clutch 18, the brake mechanism 61 and the hydraulic actuators 77, operate in the same manner as in the aforesaid embodiments.

According to this transmission system, since the brake mechanism 61 is accommodated outside of the outer periphery of the clutch drum 54 of the input clutch 53 and provided on the extension member of the flywheel dumper 90, the axial size of the transmission can be reduced and the requirement of braking torque can be obtained with compact construction.

Figure 13:
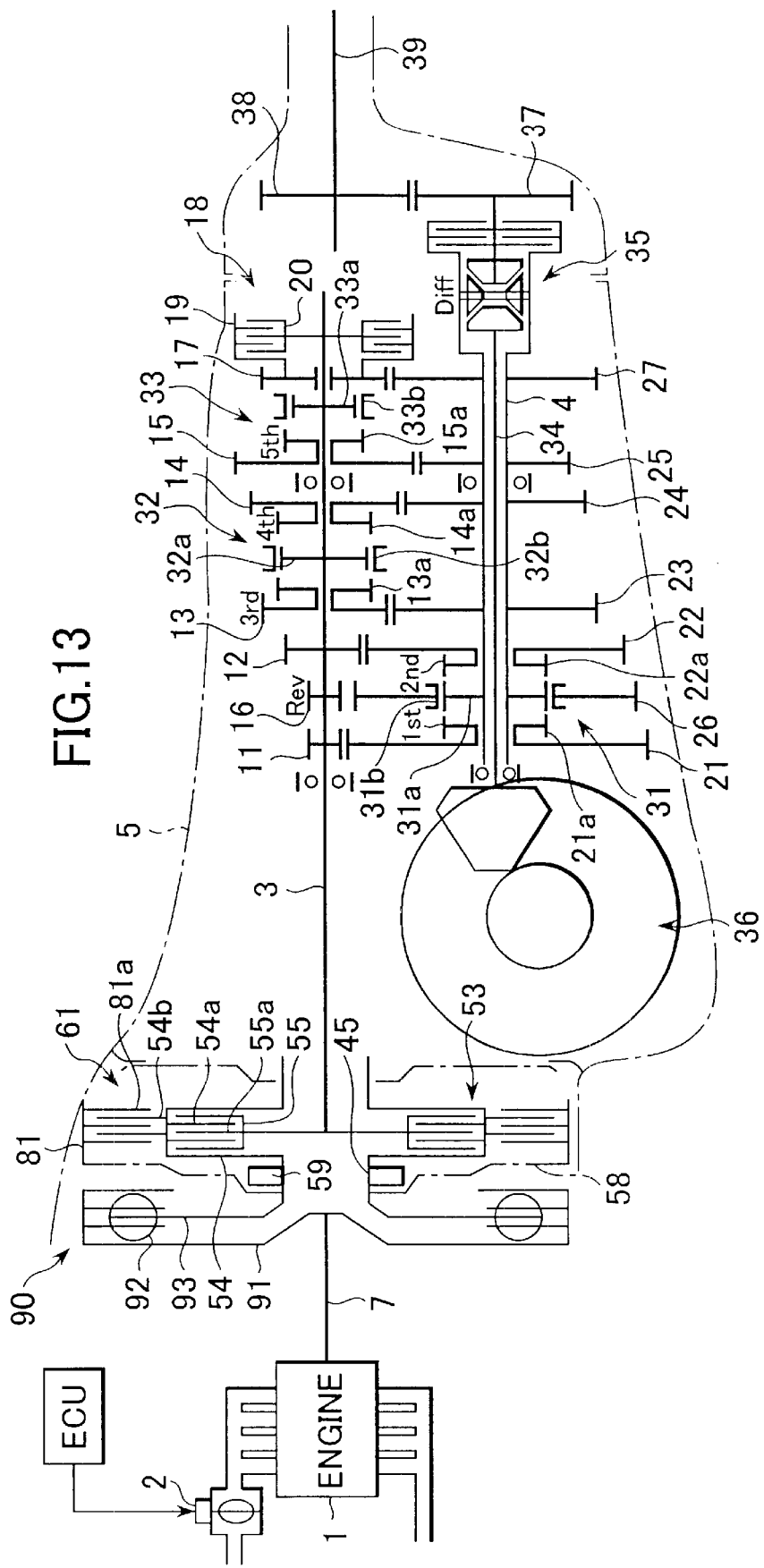
FIG. 13 is a skeleton diagram showing a transmission system for a vehicle according to a seventh embodiment of the present invention.

FIG. 13 is a skeleton diagram showing a transmission system according to a seventh embodiment. The transmission system comprises the flywheel dumper 90, an input clutch 53, a brake mechanism 61, a plurality of shift gear trains and a bypass clutch 18 in the same manner as the sixth embodiment. The difference between this embodiment and the sixth embodiment is that the brake system of the sixth embodiment is a disc brake type and on the other hand the brake system of the seventh embodiment is a multiple disc brake type of which construction is the same as that of the second embodiment.

According to this transmission system, since the brake mechanism 61 is provided around the clutch drum 54 of the input clutch 53, an up-sizing of the transmission in an axial direction in incorporating the brake mechanism 61 into the transmission can be prevented.

While the present invention has been disclosed in terms of the preferred embodiments in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. An automatic transmission system for a vehicle having an input shaft, an output shaft, a plurality of drive gears mounted on said input shaft, a plurality of driven gears mounted on said output shaft and meshing with said drive gears, a torque converter disposed between a crankshaft of an engine and said input shaft, synchromesh mechanisms for synchronously engaging said drive gears with said driven gears and a shift controller for automatically actuating said synchromesh mechanisms so as to obtain a required gear ratio, comprising:

a lock-up clutch incorporated in said torque converter between said crankshaft and an output element of said torque converter for connecting said crankshaft with said input shaft;

an electronically controlled throttle valve for automatically operating to reduce a rotation speed of said crankshaft when the gear is shifted so as to smoothly synchronize said drive gears with said driven gears;

a bypass clutch for transmitting torque from said input shaft to said output shaft when the gear is shifted, while said electronically controlled throttle valve operates to reduce a rotation speed of said engine;

an input clutch disposed between said output element of said torque converter and said input shaft for selectively controlling a torque transmission from said output element of said torque converter to said input shaft when the gear is shifted; and a brake mechanism for additionally reducing a rotational speed of said crankshaft while said electronically controlled throttle valve operates to reduce a rotational speed of said crankshaft so as to smoothly and swiftly engage said drive gears with said driven gears.

2. The automatic transmission system according to claim 1, wherein
   said brake mechanism is disposed on an impeller shell of said torque converter between said impeller shell and a transmission case.

3. The automatic transmission system according to claim 1, wherein
   said brake mechanism is mounted on an a clutch drum of said input clutch between said clutch drum and a transmission case.

4. The automatic transmission system according to claim 1, wherein
   said brake mechanism is incorporated in said torque converter between a member constituting said impeller shell of said torque converter and a fixed member for supporting a reaction torque of a stator.

5. The automatic transmission system according to claim 1, wherein
   said input clutch is incorporated in said torque converter integrally with said lock-up clutch.

6. An automatic transmission system for a vehicle having an input shaft, an output shaft, a plurality of drive gears mounted on said input shaft, a plurality of driven gears mounted on said output shaft and meshing with said drive gears, a flywheel disposed between a crankshaft of an engine and said input shaft, synchromesh mechanisms for synchronously engaging said drive gears with said driven gears and a shift controller for automatically actuating said synchromesh mechanisms so as to obtain a required gear ratio, comprising:

an electronically controlled throttle valve for automatically operating to reduce a rotation speed of said crankshaft when the gear is shifted so as to smoothly synchronize said drive gears with said driven gears;

a bypass clutch for transmitting torque from said input shaft to said output shaft when the gear is shifted, while said electronically controlled throttle valve operates to reduce a rotation speed of said engine;

an input clutch is disposed between said flywheel and said input clutch for selectively controlling a torque transmission from said output element of said torque converter to said input shaft when the gear is shifted; and a brake mechanism for additionally reducing a rotational speed of said crankshaft while said electronically controlled throttle valve operates to reduce a rotational speed of said crankshaft so as to smoothly and swiftly engage said drive gears with said driven gears.

7. The automatic transmission system according to claim 6, wherein said brake mechanism is mounted on said flywheel between said flywheel and a transmission case.

8. The automatic transmission system according to claim 6, wherein said brake mechanism is mounted on a clutch drum of said input clutch between said clutch drum and a transmission case.

9. An automatic transmission system for a vehicle having an input shaft, an output shaft, a shift gear train provided between said input shaft and said output shaft, a coupling device connecting a crankshaft of an engine and said input shaft and a controller for connecting a gear shifting of said gear shift train to obtain a required gear ratio, comprising:

an input clutch provided to control a torque transmission to said shift gear train during said gear shifting;

a bypass clutch provided to control a torque transmission from said input shaft to said output shaft during said gear shifting;

an electronically controlled throttle valve of said engine operative to reduce a rotation speed of said crankshaft during gear shifting, and a brake mechanism provided to reduce a rotational speed of said crankshaft in cooperation with said electronically controlled throttle valve during said gear shifting.

* * * * *